Dec. 16, 1958   H. B. MERRIMAN ET AL   2,864,267
TRANSMISSION FOR PACKAGING MACHINES
Filed Aug. 21, 1956
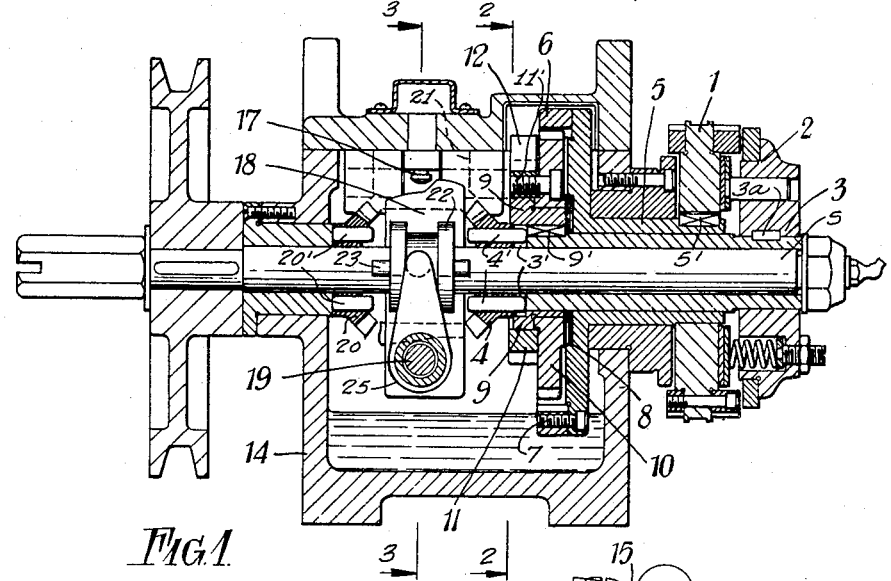
FIG. 1.
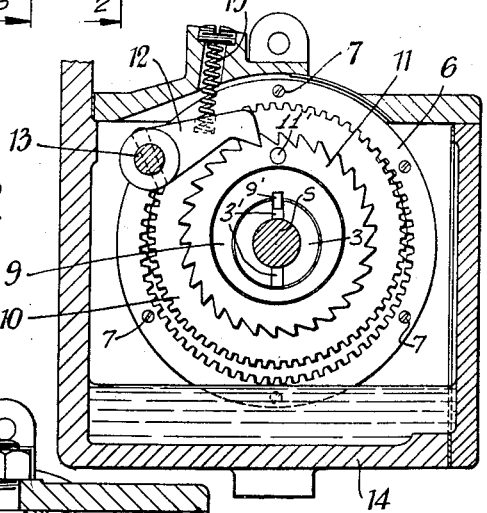
FIG. 2.
FIG. 3.
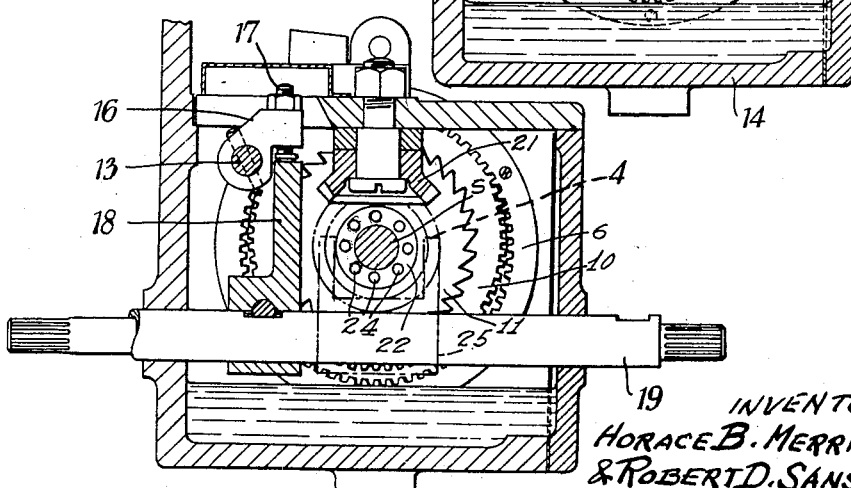
INVENTORS
HORACE B. MERRIMAN
& ROBERT D. SANSUM
BY
*Munn & Smiley*

United States Patent Office 2,864,267
Patented Dec. 16, 1958

2,864,267

TRANSMISSION FOR PACKAGING MACHINES

Horace Bartlett Merriman and Robert David Sansum, Brentford, England, assignors to Gerrard Industries Limited, Brentford, England Application August 21, 1956, Serial No. 605,317

Claims priority, application Great Britain September 2, 1955

4 Claims. (Cl. 74—805)

This invention relates to improvements in packaging machines of the kind in which flat metal band is tensioned about a package by rotation of a drum and has its ends joined by mechanical deformation of an applied metal seal.

A machine of the above kind of our manufacture has a band feeding and tensioning drum which is driven comparatively rapidly through a friction clutch to apply an initial tension to the band and on attainment of this initial tension is driven positively and more slowly by a step-by-step ratchet and pawl mechanism. This mechanism involves high loading and stressing of some of the components so that heat treatment of the various parts must be really effective if mechanical failure is to be avoided.

The present invention is directed to the provision of improved mechanism for applying a final tensioning drive to the drum of the machines of the kind referred to.

According to the invention a packaging machine of the kind referred to has the band tensioning drum normally driven through a friction clutch and an epicyclic gear of the gyral type for applying a final tensioning drive to the drum, the said gear comprising an internally toothed wheel keyed to a hollow shaft on which the drum is mounted, an externally toothed planet wheel having a smaller number of teeth meshed with the teeth of the internally toothed wheel and carried freely on an eccentric keyed to the clutch driving shaft or sleeve which rotates freely within the hollow shaft and a ratchet fixed to the face of the planet wheel and engaged by spring-pressed pawl to prevent any substantial rotation of the planet wheel in the sense opposite to a tensioning rotation of the internally toothed wheel.

By selecting appropriate tooth numbers for the internally toothed and planet wheels the overall gear ratio between clutch shaft and drum for a final tensioning drive can be made sufficiently high. For example with 64 teeth on the internally toothed wheel or annulus and 60 teeth on the planet wheel, a ratio of 16 to 1 is attained.

The pawl should be provided with means for positively lifting it out of engagement with the ratchet for a band feeding movement of the drum and such means may be conveniently operated by the actuating mechanism of a reverse gear by which the clutch shaft is caused to rotate in one sense or the other.

In operation the drum is driven at comparatively high speed both on band feeding and initial band tensioning movements through the friction clutch with the pawl positively disengaged for the former movement and passing freely over the teeth of the ratchet on the planet wheel during the initial tensioning movement. As the band is tightened and applies a reaction to the drum and thus to the internally toothed wheel, and planet wheel, the pawl engages behind a tooth of the ratchet on the planet wheel which is thereafter rolled around the inside of internally toothed wheel by its eccentric carrier and shifts the internally toothed wheel by only the number of teeth on the planet wheel subtracted from the number of teeth of the internally toothed wheel.

The above and other parts of the invention are embodied in a preferred form of tensioning mechanism for packaging machines which will now be described in some detail by way of example with reference to the accompanying drawings in which:

Fig. 1 is a central vertical section through a tensioning mechanism,
Fig. 2 is a section on the line 2—2 of Fig. 1,
Fig. 3 is a section on the line 3—3 of Fig. 1.

A packaging machine has a band feeding and tensioning drum 1 which is driven in one direction or the other by a slip coupling 2 fixed by a key 3a to a driving sleeve 3 fixed to a mitre wheel 4 of a reverse gear by means of clutch dowels 4' carried by the wheel 4 and engaging in radial slots 3' (Figure 2) in the end of the sleeve 3. The sleeve 3 and wheel 4 are both journalled on a main drive shaft S.

The reverse gear is of known structure, the wheel 4 and a second mitre wheel 20, also journalled on the shaft S, being connected by an idler mitre wheel 21 (phantom lines in Figure 1, full lines in Figure 3) and being selectively clutched to the shaft S to drive the sleeve 3 in the desired direction. The wheel 20 has dowels 20' (Figure 1) and the dowels 4' or 20' are selectively engaged by a clutch dog 22 that is slidable axially on but rotatively fixed by a key 23 with the main shaft S intermediate the wheels 4 and 20. The clutch dog 22 has dowel nesting sockets 24 (Figure 3) selectively engaged with the dowels 4' or 20' by a yoke 25 (full lines in Figure 1, phantom lines in Figure 3) fixed on a rockable gear actuating shaft 19 disposed at right angles to the main shaft S.

The drum 1 is fixed by a key 5' to a sleeve shaft 5 which is journalled on the sleeve 3 and is flanged at the opposite end to provide anchorage for an internally toothed wheel 6, which is attached to it as by screws 7.

An annular recess in the flange accommodates a substantial thrust washer 8 which may be bronze.

An eccentric sleeve 9 is fixed by a key 9' on the driving sleeve 3 and an externally toothed planet wheel 10 is mounted for free rotation upon the eccentric sleeve 9. The teeth of the planet wheel 10 (say 60 teeth) are meshed with those of the internally toothed wheel 6 (say 64 teeth).

A ratchet wheel 11 of diameter somewhat less than that of the planet wheel 10 is secured by a bolt 11' to its face outside the free surface of the internally toothed wheel 6.

A pawl 12 is keyed to a shaft 13 which lies parallel to the axis of the sleeve shaft 5 and is carried in suitable bearings in the casing 14 of the drum drive gear box. The pawl 12 is urged into engagement with the teeth of the ratchet wheel by a spring 15 located between the pawl and the cover of the gear box. However a lever arm bracket 16 secured to the shaft 13 is provided, and this lever arm bracket is fitted with an adjustable contact screw 17 which is in operative contact with a cam plate 18.

The cam plate 18 is keyed to the rock shaft 19 (running at right angles to the hollow driving shaft 5 across the gear box 14) which is rotated in one direction or the other to operate the reverse gear so as to drive the hollow driving shaft 5 in one direction or the other.

The arrangement is such that when the reverse gear actuating shaft 19 is shifted to a position causing the gear, hollow driving shaft 5 and slip coupling 2 to drive the drum 1 to feed out band, the cam 18 thereon shifts the shaft 13 carrying the pawl 12 sufficiently to disengage the pawl 12 from the teeth of the ratchet wheel 11. This permits the feeding and tensioning drum 1 to be driven freely in the sense (anticlockwise in Figures 2 and 3) to feed out band, but when the gear actuator shaft 19 is shifted to cause a rotation of the drum 1 in the direction (clockwise in Figures 2 and 3) to tension band about a package, the pawl 12 is permitted to fall into full engagement with the ratchet wheel 11, so that only movement in the tensioning direction can take place.

As explained above, when a sufficient initial tension has been applied to a length of band through the slip coupling 2 and a reaction force is thereby applied to the drum 1 tending to turn it (and the internally toothed wheel 6) in the anticlockwise or feeding direction, the pawl 12 will hold the planet wheel 10 against any substantial rotation. In this condition the planet wheel 10 is oscillated but not rotated around the inside of the internally toothed wheel 6 by its eccentric 9 and moves the internally toothed wheel 6 by the difference in the number of tooth of the two wheels in the tensioning direction.

In the present example the internally toothed wheel 6 (64 teeth) will be moved through 4 teeth for every revolution of the eccentric 9 carrying the planet wheel 10 (60 teeth) giving a ratio of $$\frac{64-60}{64} = \frac{4}{64} = \frac{1}{16}$$

This substantial reduction enables an electric or like motor driving the driving sleeve 3 to apply a high final tension with moderate power and without involving unduly high stressing of the parts of the tensioning mechanism.

It will be understood that the invention is not restricted to the details of the specific embodiment described which may be varied without departing from the scope of the following claims.

We claim:
1. A transmission for packaging machines comprising a slip coupling, a drive shaft, a band tensioning drum normally driven by said drive shaft through said slip coupling, a reversible drive mechanism comprising epicyclic gear means for applying a final tensioning drive to the drum and including a sleeve shaft freely rotatable about said drive shaft, an internally toothed wheel fixed with said sleeve shaft, an externally toothed planet wheel having a smaller number of teeth meshing with the teeth of the internally toothed wheel, an eccentric keyed to the drive shaft and freely carrying said externally toothed planet wheel, a ratchet fixed to the planet wheel, and a spring pressed pawl engaging the ratchet to prevent any substantial rotation of the planet wheel in the direction opposite to a tensioning rotation of the internally toothed wheel.

2. A packaging machine as set forth in claim 1, including mechanism for lifting the pawl out of engagement with the ratchet.

3. A packaging machine as defined in claim 2, wherein said reversible drive mechanism includes a reversing gear operating shaft, and said pawl lifting mechanism comprises a cam fixed on the reverse gear operating shaft and a lever arm mounted on a shaft keyed to said pawl.

4. A packaging machine as set forth in claim 3, wherein said lever arm is provided with an adjustable contact screw for engagement with said cam.

References Cited in the file of this patent
UNITED STATES PATENTS

| | | |
|---|---|---|
| 2,170,238 | Farmer | Aug. 22, 1939 |
| 2,667,076 | Favre | Jan. 26, 1954 |
| 2,701,974 | Miller | Feb. 15, 1955 |
| 2,707,429 | Leslie et al. | May 3, 1955 |